US008619592B2

(12) United States Patent
Pelletier et al.

(10) Patent No.: US 8,619,592 B2
(45) Date of Patent: Dec. 31, 2013

(54) METHOD AND APPARATUS FOR INCREASED INTERNET PROTOCOL (IP) HEADERS COMPRESSION PERFORMANCE BY REPORTING CAUSE OF MISSING PACKETS

(75) Inventors: Ghyslain Pelletier, Lulea (SE); Lila Madour, Kirkland (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2748 days.

(21) Appl. No.: 10/458,328

(22) Filed: Jun. 11, 2003

(65) Prior Publication Data

US 2004/0034717 A1 Feb. 19, 2004

Related U.S. Application Data

(60) Provisional application No. 60/387,609, filed on Jun. 12, 2002.

(51) Int. Cl.
*H04J 1/16* (2006.01)
(52) U.S. Cl.
USPC .......................... 370/242; 370/392; 709/247
(58) Field of Classification Search
USPC .......... 709/247, 238; 370/242, 329, 392, 469, 370/474
See application file for complete search history.

(56) References Cited

U.S. PATENT DOCUMENTS

| 5,596,573 | A  | * | 1/1997  | Bertland ....................... 370/474 |
| 5,963,551 | A  | * | 10/1999 | Minko ........................... 370/356 |
| 6,300,887 | B1 | * | 10/2001 | Le ................................. 341/60 |
| 6,385,199 | B2 | * | 5/2002  | Yoshimura et al. ........... 370/393 |
| 6,608,841 | B1 | * | 8/2003  | Koodli .......................... 370/474 |
| 6,609,224 | B1 | * | 8/2003  | Jonsson ........................ 714/758 |
| 6,618,397 | B1 | * | 9/2003  | Huang .......................... 370/474 |
| 6,711,164 | B1 | * | 3/2004  | Le et al. ........................ 370/392 |
| 6,820,233 | B2 | * | 11/2004 | Johansson et al. ............ 714/808 |
| 6,882,637 | B1 | * | 4/2005  | Le et al. ....................... 370/349 |
| 6,914,903 | B1 | * | 7/2005  | Miyazaki et al. ............. 370/389 |

(Continued)

FOREIGN PATENT DOCUMENTS

| WO | WO 01/31881 | 5/2001 |
| WO | WO 01/35598 | 5/2001 |
| WO | WO 01/65804 | 9/2001 |
| WO | WO 02/11397 | 2/2002 |

OTHER PUBLICATIONS

Robust Header Compression (ROHC) Working Group of the Internet Engineering Task Force (IETF). ☐☐RFC 3242 [LLA], and RFC 3095 (RFC3095)—RFC 3095—RObust Header Compression (ROHC).*

(Continued)

*Primary Examiner* — Brian O'Connor

(57) ABSTRACT

A decompressor, a compressor and methods in an Internet Protocol (IP) network for reporting cause of missing packets. A cause of unsuccessful reception or sending of a compressed packet addressed is reported to a compressor/decompressor node. The compressor/decompressor node decides or predicts if a decompression context associated with the decompressor is invalidated by analyzing the cause of the unsuccessful reception and, optionally, analyzing a re-initialization agreement between the compressor and the decompressor. In an optional embodiment of the present invention, the compressor/decompressor node use the decision or prediction to exchange information to reinitialize the decompression context associated with the decompressor. In a preferable embodiment of the present invention, the detection of the unsuccessful sending or reception is performed at a Medium Access (MAC) layer associated with the compressor/decompressor node.

12 Claims, 3 Drawing Sheets

(56) References Cited

U.S. PATENT DOCUMENTS

| | | | |
|---|---|---|---|
| 6,959,410 B2* | 10/2005 | Hata et al. | 714/746 |
| 6,967,930 B2* | 11/2005 | Burmeister et al. | 370/253 |
| 6,967,964 B1* | 11/2005 | Svanbro et al. | 370/437 |
| 6,970,476 B1* | 11/2005 | Jonsson et al. | 370/401 |
| 7,010,727 B1* | 3/2006 | Stucker | 714/52 |
| 7,031,666 B2* | 4/2006 | Hsu | 455/72 |
| 7,035,287 B2* | 4/2006 | Tourunen et al. | 370/477 |
| 7,046,672 B2* | 5/2006 | Liao et al. | 370/395.1 |
| 7,054,954 B2* | 5/2006 | Kalliokulju | 709/247 |
| 7,058,728 B1* | 6/2006 | Eklund | 709/247 |
| 7,061,936 B2* | 6/2006 | Yoshimura et al. | 370/474 |
| 7,069,495 B2* | 6/2006 | Soderberg et al. | 714/776 |
| 7,148,518 B2* | 12/2006 | Sugawara et al. | 257/97 |
| 7,164,665 B2* | 1/2007 | Tourunen | 370/329 |
| 7,212,511 B2* | 5/2007 | Jonsson et al. | 370/338 |
| 7,215,667 B1* | 5/2007 | Davis | 370/389 |
| 7,295,575 B2* | 11/2007 | Ido et al. | 370/474 |
| 7,317,724 B2* | 1/2008 | Koren et al. | 370/394 |
| 7,346,077 B2* | 3/2008 | Tourunen et al. | 370/469 |
| 7,512,716 B2* | 3/2009 | Pelletier et al. | 709/247 |
| 7,539,130 B2* | 5/2009 | Le et al. | 370/216 |
| 7,647,421 B2* | 1/2010 | Zhang et al. | 709/236 |
| 7,885,294 B2* | 2/2011 | Patel et al. | 370/477 |
| RE43,100 E* | 1/2012 | Hata et al. | 714/746 |
| 2002/0026620 A1* | 2/2002 | Johansson et al. | 714/807 |
| 2002/0105971 A1* | 8/2002 | Tourunen et al. | 370/469 |
| 2003/0067918 A1* | 4/2003 | DeMars | 370/392 |
| 2004/0034708 A1* | 2/2004 | Pelletier et al. | 709/227 |

OTHER PUBLICATIONS

Boggia et al., "ROHC+: A New Header Compression Scheme for TCP Streams in 3G Wireless Systems", IEEE Communications, May 2, 2002, p. 3271-3278.*
West et al. "IP header and Signalling Compression for 3G Systems", 3G Mobile Communication Technologies, May 10, 2002, p. 102-106.*
Svanbro et al. ("Wireless Real-time IP Service Enabled by Header Compression", Svanbro et al., IEEE, May 18, 2000, p. 1150-1155.*
Jonsson et al., "Robust Checksum based header Compression (ROCCO)",, IETF, Sep. 1, 1999.*
Robust Header Compression (ROHC) Working Group of the Internet Engineering Task Force (IETF), RFC 3242 [LLA], Apr. 2002.*
RFC 3095 (RFC3095)—RFC 3095—Robust Header Compression (ROHC), Jul. 2001.*
M. Degermark et al., IP Header Compression, Network Working Group, RFC 2507, Feb. 1999.
V. Jacobson, Compressing TCP/IP Headers for Low-Speed Serial Links, Network Working Group, RFC 1144, Feb. 1990.
S. Casner et al., Compressing IP/UDP/RTP Headers for Low-Speed Serial Links, Network Working Group, RFC 2508, Feb. 1999.
C. Borman et al., Robust Header Compression (ROHC): Framework and four profiles: RTP, UDP, ESP, and uncompressed, Network Working Group, RFC 3095, Jul. 2001.
L.E. Jonsson et al., Robust Header Compression (ROHC): A Link-Layer Assisted Profile for IP/UDP/RTP, Network Working Group, RFC 3242, Apr. 2002.

* cited by examiner

METHOD AND APPARATUS FOR INCREASED INTERNET PROTOCOL (IP) HEADERS COMPRESSION PERFORMANCE BY REPORTING CAUSE OF MISSING PACKETS

PRIORITY STATEMENT UNDER 35 U.S.C S.119 (e) & 37 C.F.R. S.1.78

This non-provisional patent application claims priority based upon the prior U.S. provisional patent application entitled "A method for IP Header compression", application No. 60/387,609, filed Jun. 12, 2002, in the names of Lila MADOUR and Ghyslain PELLETIER.

BACKGROUND OF THE INVENTION

1. Field of the Invention

The present invention relates to increased Internet Protocol Headers compression performance by reporting cause of missing packets.

2. Description of the Related Art

Due to the tremendous success of the Internet, it has become a challenging task to make use of the Internet Protocols (IP) over all kinds of network links. IP usually refer to numerous packet switching protocols such as IPv4 (Internet protocol version 4), IPv6 (Internet protocol version 6), UDP (User Datagram Protocol), UDP-Lite, TCP (Transport Control Protocol), RTP (Real-time Protocol), etc. An IP packet is usually composed of a payload of information sequentially encapsulated in one or more IP protocols. Reference is now made to the Drawings wherein FIG. 1 shows an exemplary IP packet 100 formed by a payload 110, a RTP header 140, a UDP header 130 and an IPv4 header 120. The IP packet 100 is referred to as an IPv4/UDP/RTP packet. For simplicity purposes, the headers 120, 130 and 140 are usually jointly referred to as IP headers 150. It should be understood that other sets and subsets of IP protocols each having different header configurations can be used to form the IP packet 100 and the IP headers 150. Each header 120, 130 and 140 of the IP headers 150 carries specific information about the IP packet 100, which information is used by the destination of the packet 100 to interpret the payload 110. The carried information in the IP headers may include origination and destination of the IP packet 100, associated quality of service information, a sequence number, checksum information for integrity of the payload, etc. One drawback of IP is the large size of the IP headers. It is not a simple task to make use of IP over narrow band network links as, for example, cellular links. As an example, using the IP protocols for ordinary speech data (e.g. Voice-over-IP or VoIP using IPv4/UPD/RTP or IPv6/UPD/RTP) may represent a loss of as much as 70% of the bandwidth capacity of a given network link.

The term header compression (HC) comprises the art of minimizing the necessary bandwidth used by the IP headers. It is usually performed on a per-hop basis over point-to-point network links. Header compression techniques, in general, have a more than ten-year-old history within the Internet community. Several techniques commonly used are described in the following documents: RFC 1144 [VJ], RFC 2507 [IPHC] and RFC 2508 [CRTP], all herein included by reference. Header compression takes advantage of the fact that some fields in the IP headers are not changing (static) within a stream of packet pertaining to a given packet flow, or change with small or predictable values. Header compression techniques make use of these characteristics and send static information only initially, while changing fields are sent with their absolute values or as differences from packet to packet. Completely random information has to be sent without any compression at all. The challenging task of any header compression technique is to keep both ends of the network link consistent with each other. For that purpose, a compressor at one end and a decompressor at the other end each make use of a compression context. The use of the compression contexts aims at keeping the IP headers size as low as possible. To do so, each end manages all necessary information to eliminate some fields (totally or partially) from the IP headers at the compressor end and to rebuild the IP headers at the decompressor end.

Header compression techniques are thus an important component to make VoIP over Wireless (VoIPoW) an economically feasible alternative to circuit switched voice. For this purpose, some header compression techniques have been developed by the Robust Header Compression (ROHC) Working Group of the Internet Engineering Task Force (IETF). RFC 3095 [ROHC] and RFC 3242 [LLA] herein included by reference, describes an extensible framework for which profiles for compression of various networking protocols may be defined. The following example takes the header compression technique defined in ROHC as an example. In such a case, the compression contexts of both the compressor and the decompressor contain and maintain relevant information about past packets, which information is used to compress and decompress subsequent packets. More precisely, ROHC says the following: "The context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream [or flow] is also part of the context, for example information about how the IP Identifier field changes and the typical inter-packet increase in sequence numbers or timestamps."

In order to work properly, each header compression technique requires an initialization phase during which the compressor and the decompressor build their respective compression context. This phase is usually referred to as the context initialization phase. It usually requires the compressor to start using a low compression state. Initially, the transmitted packets contain the information necessary to initialize at least the static and maybe the dynamic part of the decompressor context. The compressor must then have enough confidence that the decompressor has the proper context before a transition to a higher compression ratio takes place. This confidence may be achieved using explicit feedback from the decompressor to the compressor, or by sending a number of context initialization packets repeatedly for a large enough interval. The use of explicit feedback requires at least one Round-Trip Time (RTT) period before confidence may be achieved. The use of a predetermined number of packets may achieve confidence in less than one RTT period but cannot absolutely guarantee that the decompressor does have the proper context other than optimistically expect to be successful with a high percentage rate. The maximum compression ratio achievable on a given link largely depends on the header compression technique used thereon. However, it takes several phases of confidence/transition before reaching the maximum compression ratio of a given compression technique.

The described problem also causes other problems when the compression context must be reinitialized during a session. It mainly happens when too many packets or frame are lost during a transmission. The compression context must be reinitialized completely (e.g. both static and dynamic portions), in parts (e.g. static portion only) or updated (e.g. selected fields modified) after it has been invalidated. The invalidation criteria are usually specified by an Optimistic Approach Agreement (OAA) between the compressor and decompressor, as defined in [LLA] (Link-Layered assisted). The OAA specifies the maximum number of dropped or missing packets acceptable before deciding that a compression context should be invalidated or that a lower compression ratio should be applied. After invalidation, the compression context should be reinitialized. In some occasions, the dropped packets are due to the use of the link for more prioritized packets such as signaling packets. However, the information about the dropped packets is not available to the compressor and decompressor when they take their decision to invalidate and later on reinitialize the compression context. This situation causes a certain delay for which the compression efficiency is far from optimal or totally null. It further causes packets to be lost between the invalidation decision and completion of the re-initialization. In the example of VoIP flows over very narrow bandwidth wireless links, such delay and losses impact the perceived quality of speech until optimal compression efficiency is reached again.

As it can be appreciated, there is a need for an increased Internet Protocol (IP) Headers compression performance by reporting cause of missing packets.

SUMMARY OF THE INVENTION

A first object of the present invention is directed to a decompressor in an Internet Protocol (IP) network. The decompressor comprises a Cause Reporting Module capable of receiving a cause of unsuccessful reception of a compressed packet addressed to the decompressor and a Compression Context Initialization Module capable of deciding if a decompression context associated with the decompressor is invalidated by analyzing the cause of the unsuccessful reception. In an optional embodiment of the present invention, the Compression Context Initialization Module may be further capable of requesting information to reinitialize the decompression context from the compressor if the decompression context associated with the decompressor is invalidated. The Compression Context Initialization Module may further be capable of deciding if a decompression context associated with the decompressor is invalidated by analyzing the cause of the unsuccessful reception and by analyzing a re-initialization agreement between the compressor and the decompressor. In a preferable embodiment of the present invention, detection of the unsuccessful reception is performed at a Medium Access Control (MAC) layer associated with the decompressor.

A second object of the invention is directed to a method for reporting cause of missing packets in an Internet Protocol (IP) network wherein the IP network comprises a compressor and a decompressor. The decompressor has a Medium Access Control (MAC) layer associated therewith. The method comprises steps of sending a compressed packet from the compressor toward the MAC layer, detecting at the MAC layer an unsuccessful reception of the compressed packet from the compressor and reporting a cause of the unsuccessful reception to the decompressor. In an optional embodiment of the present invention, the method may further comprise a step of deciding if a decompression context associated with the decompressor is invalidated by analyzing the cause of the unsuccessful reception. The method may further comprise a step of requesting information to reinitialize the decompression context from the compressor if the decompression context associated with the decompressor is invalidated. In such a case, the step of deciding if the decompression context associated with the decompressor is invalidated by analyzing the cause of the unsuccessful reception may further comprise analyzing a re-initialization agreement between the compressor and the decompressor.

A third object of the present invention is directed to a compressor in an Internet Protocol (IP) network. The compressor comprises a Cause Reporting Module capable of sending a compressed packet addressed toward a decompressor to a MAC layer associated therewith and receiving a cause of unsuccessful sending of the compressed packet from the MAC layer. The compressor further comprises a Compression Context Initialization Module capable of predicting if a decompression context associated with the decompressor is to be invalidated by analyzing the cause of the unsuccessful sending. In an optional embodiment of the present invention, the Compression Context Initialization Module may be further capable of sending information to reinitialize the decompression context toward the decompressor if the decompression context associated with the decompressor is to be invalidated. The Compression Context Initialization Module may further be capable of predicting if a decompression context associated with the decompressor is to be invalidated by analyzing the cause of the unsuccessful sending and by analyzing a re-initialization agreement between the compressor and the decompressor. In a preferable embodiment of the present invention, the detection of the unsuccessful sending is performed at the MAC layer associated with the compressor node.

A fourth object of the present invention is directed to method for reporting cause of missing packets in an Internet Protocol (IP) network wherein the IP network comprises a Compressor and a Decompressor. The compressor has a Medium Access Control (MAC) layer associated therewith. The method comprises steps of sending a compressed packet from the compressor to the first MAC layer, detecting at the MAC layer an unsuccessful sending of the compressed packet toward the decompressor and reporting a cause of the unsuccessful sending to the compressor. In an optional embodiment of the present invention, the method further comprises a step of predicting if a decompression context associated with the decompressor is to be invalidated by analyzing the cause of the unsuccessful sending. The method may further comprise a step of sending information to reinitialize the decompression context toward the decompressor if the decompression context associated with the decompressor is to be invalidated. In such a case, the step of predicting if a decompression context associated with the decompressor is to be invalidated by analyzing the cause of the unsuccessful sending may further comprise analyzing a re-initialization agreement between the compressor and the decompressor.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

Figure 1:
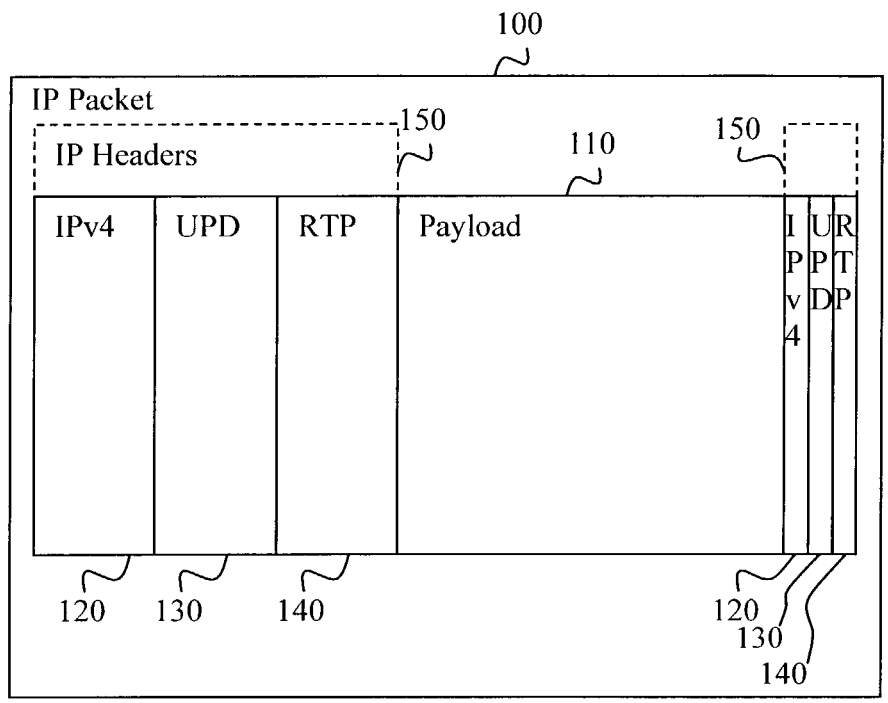
FIG. 1 shows a schematic representation of an exemplary Internet Protocol (IP) packet.

The present invention aims at enabling the compressor and the decompressor to take better decision regarding the compression context re-initialization during an already established session. As outlined above, it is desirable to find a solution that will further optimize the header compression efficiency in systems for which delay towards the optimal compression ratio must be minimized and for which bandwidth is very limited. One of the inventive mechanisms is to report the cause of missing or dropped packets to the compressor and the decompressor before deciding to reinitialize completely (e.g. both static and dynamic portions) or in parts (e.g. static portion only) or update (e.g. selected fields modified) the decompression context. Throughout the following discussion, it should be understood that "reinitializing the decompression context" may refer to any of the three possibilities of completely reinitializing, reinitializing in parts or updating the decompression context.

The innovative mechanism of the present invention applies after establishment of an IP headers compressed packet flow. It further defines a new cause reporting message exchanged between the compressor and the decompressor. The cause reporting message includes the cause of any missing packet, with the minimal set of alternatives being one of "transmission error" and "other cause". Other exemplary alternatives can be found such as "pre-empted for signaling" and "prioritized traffic"

Every packet missing from the IP headers compressed packet flow must be signaled along with the cause by a cause reporting message. For instance, the packet may be missing due to a physical loss over the wireless link (transmission error) or due to the use of the link by the system for signaling traffic. This information must be available to the compressor that decides which packet to send and to the decompressor.

The present invention further defines a re-initialization agreement between the compressor and the decompressor on missing packets. In some IP headers compression mechanisms, such a re-initialization agreement complements an existing OAA. The re-initialization agreement is done in order for system-signaling traffic not to trigger re-initialization of any compression contexts. The re-initialization agreement may be established before the first packet of the session is exchanged. It may also be part of standardized procedures followed by each parties of the session. It should be understood that the re-initialization agreement may specify conditions for an update, a complete re-initialization or a partial re-initialization.

From the compressor perspective, enforcing the re-initialization agreement consists in monitoring the number of consecutive packets that are pre-empted and not sent.

In the event where the number of consecutive pre-empted packets is equal to or higher than the agreed number in the re-initialization agreement or in the existing OAA and that at least one of these packets is context-updating, re-initialization of the compression context should take place.

From the decompressor perspective, enforcing the re-initialization agreement consists of deciding not to invalidate the compression context in cases where:

the number of consecutive missing packets is equal to or higher than the agreed number in the re-initialization agreement or in the existing OAA; and all of these consecutive missing packets were caused by system signaling.

In cases where there are consecutive missing packets of a number equal to or higher than the agreed number in the re-initialization agreement or in the existing OAA and that at least one packet is missing due to a transmission error, re-initialization of the compression context should take place. This is necessary to avoid a condition where the loss of a context-updating packet is undetected by the decompressor.

Furthermore, the present invention provides an alternative re-initialization mechanism to improve the use of existing mechanisms such as the existing OAA in cases where the cause reporting message is available in the following way.

If the re-initialization agreement between the compressor and the decompressor on missing packets as previously described is not used, the information pertaining to the nature of the cause of missing packets may still be used to detect the need to perform a compression context update without waiting for any explicit feedback or other signaling from the decompressor side. This compression context update may also be subject to the existing OAA.

In such a case, it results in better compression efficiency and thus, in bandwidth savings since the data required for maintaining efficiency of the IP Headers compression mechanism in the event of packets losses between the compressor and the decompressor is minimized. It also ensures a higher degree of robustness for IP headers compression mechanisms that make use of the existing OAA.

The present invention is of particular interest, but is not limited to, the LLA profile of the ROHC IP headers compression mechanism for VoIP [ROHC LLA]. It should be noted that even if the generic terms of IP headers compression, IP headers compressor and IP headers decompressor are used, it does not limit the innovative teachings of the present invention to any specific IP headers compression mechanism. Furthermore, the terms compressor and decompressor represent all logic portions needed at each end of a given compressed link to manage everything related to the compressed packet flow, including sending and receiving and routing packets.

Note that the present invention assumes that the decompressor knows that the compressor implements the additional logic required to enforce the re-initialization agreement and the cause reporting message. It may thus be specified by a given system signaling or within the definition of a packet data service itself (e.g. General Packet data Service (GPRS), CDMA2000®).

Figure 2:
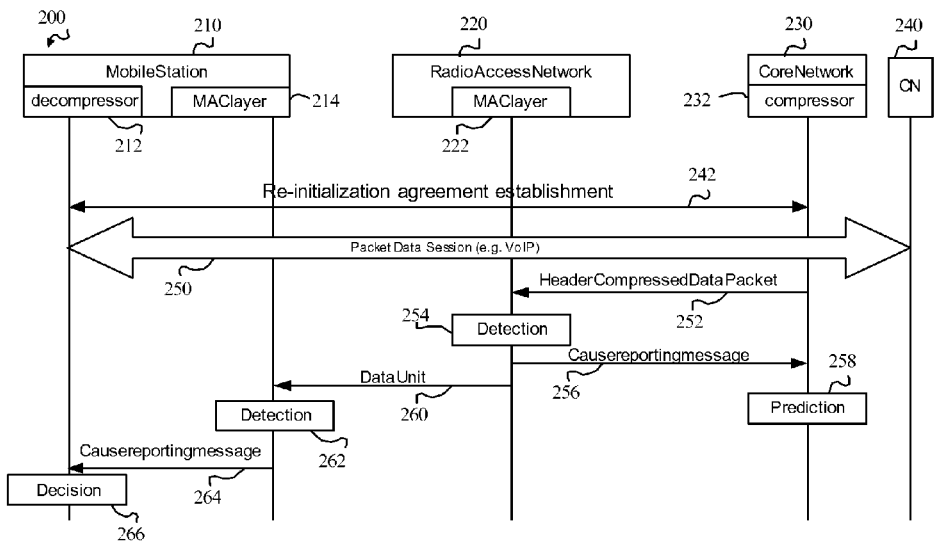
FIG. 2 is a signal flow and nodal operation chart of a wireless/cellular system (e.g., CDMA2000®) implementing a cause reporting mechanism for missed or dropped packets.

FIG. 2 is a signal flow and nodal operation chart of an Internet Protocol (IP) network 200 implementing a cause reporting mechanism for missed or dropped packets. FIG. 2 shows a Mobile Station (MS) 210, a Radio Access Network (RAN) 220, a Core Network 230 and a Correspondent Node (CN) 240. The MS 210 comprises a decompressor 212 and a Medium Access Control (MAC) layer 214. The RAN 220 comprises a MAC Layer 222. The Core network comprises a decompressor 232. The MAC layers 214 and 222 manage the traffic flowing between the MS 210 and the Core Network 230 through the RAN 220. The decompressor 212 is further associated with a decompression context (not shown). FIG. 2 further shows a previously established Packet Data Session 250 between the MS 210 and the Correspondent Node 240. In a first embodiment of the present invention, the MS 210 and the Core Network 230 further exchange necessary information for establishment of a re-initialization agreement 240 between them. This can be done during the course of the establishment of the Packet Data Session 250, through negotiation (e.g. ROHC over PPP as shown in RFC3241 herein included by reference) or it can be standardized (e.g. static parameters based on type of service). The re-initialization agreement specifies, as mentioned earlier, conditions under which the decompression context should be re-initialized. Examples of the conditions are given earlier in this discussion. In a second embodiment of the invention, the re-initialization agreement establishment 240 is not necessary since the conditions under which compression contexts should be invalidated and further re-initialized are specified later on in the process. In a third embodiment, the conditions are part of standardized information known by default by both the MS 210 and the Core Network 230.

In FIG. 2, the session 250 (e.g. Voice over IP (VoIP) call) takes place between the MS 210 and the Correspondent Node 240. The information related to the session 250 is exchanged from the Correspondent Node 240 to the Core Network 230 using IP packets on an IP link therebetween (not shown). An IP Headers Compressed Packet Flow (not shown) between the MS 210 and the Core Network 240 is established following state of the art procedures in accordance with a chosen IP headers compression algorithm, thus triggering initialization of the decompression context associated with the decompressor 212.

During the course of the session 250, the Correspondent Node 240 sends IP packets pertaining to the session 250 to the Core Network 230, which compresses them with the compressor 232 and forwards them toward the MS 210. FIG. 2 shows an exemplary Header compressed Data Packet 252 sent from the Core Network 230 to the RAN 220 onto the MAC layer 222. In a first example, the data packet 252 cannot be forwarded toward the MS 210 and is replaced with a prioritized Data Unit 260 containing, for example, system-signaling traffic. Since the MAC layer 222 is responsible for scheduling all traffic sent toward the MAC layer 214 of the MS 210, it detects that the data packet could not be sent (e.g. missed or dropped) toward the MS 210 (step 254). Such detection may further be possible by using information provided by an established protocol (e.g. Radio Link Protocol (RLP) residing in the MAC layer 222) used between the RAN 220 and the MS 210. Following the detection 254, the MAC layer 222 sends a cause reporting message 256 toward the compressor 232 at the Core Network 230. The cause reporting message 256 specifies a cause to the missed or dropped data packet (in this first example, it may specify "pre-empted, system-signaling"). Examples of the cause include bad link conditions, higher prioritized traffic (e.g. network or system signaling, emergency traffic (e.g. 911)), unknown or other cause, etc.

In a first embodiment of the present invention, the compressor 232 of the Core Network 230 predicts if the decompression context associated with the decompressor 212 should be invalidated and further re-initialized completely, partially, updated or not invalidated (step 258). The prediction of step 258 is done upon reception and analysis of the cause reporting message 256 with regards to the established re-initialization agreement.

In a second embodiment of the present invention, since no re-initialization agreement exists, the cause reporting message 256 may further specify if the decompression context associated with the decompressor 212 should be invalidated and further re-initialized completely, partially or not invalidated. The compressor 232 of the Core Network 230 then does its prediction of step 258 in accordance with the specified information. In a third embodiment, the cause reporting message 256 only specifies the cause and the prediction of step 258 is done with regards to the known standardized conditions.

Upon reception of the Data Unit 260, the MAC layer 214 detects that the Data Unit 260 does not relate to the ongoing session 250 (step 262). This detection 262 triggers a cause reporting message 264 toward the decompressor 212. In the present example, the reported cause would be "pre-empted, system-signaling". Other examples of events causing such a detection 262 also include absence of the Data Unit 260 and presence of a Data Unit 260 pertaining to the session 250 with too many errors to be recovered. Upon reception of the cause reporting message 264, the decompressor 212 of the MS 210 decides if the decompression context should be invalidated and further re-initialized completely, partially or not invalidated (step 266).

In the first embodiment of the present invention, the decision of step 266 is taken upon reception and analysis of the cause reporting message 264 with regards to the established re-initialization agreement. In the second embodiment of the present invention, since no reinitialization agreement exists, the cause reporting message 264 may further specify if the decompression context associated with the decompressor 212 should be invalidated and further re-initialized completely, partially or not invalidated. The decompressor 212 of the MS 210 then takes the decision, step 266, in accordance with the specified instructions. In the third embodiment, the cause reporting message 264 only specifies the cause and the decision of step 266 is taken with regards to the known standardized conditions. It should be understood that the prediction of step 258 and the decision of step 266 match each other since they are based on the same algorithm.

Upon predicting at step 258 that the decompression context of the decompressor 212 would need complete or partial re-initialization, the compressor 232 does not wait for any explicit request and sends relevant information toward the decompressor 212 (not shown). While the exact nature of the relevant information and the manner in which it is sent are not the object of the present invention, sending them following the prediction of step 258 is one of the innovative teachings thereof.

Upon deciding at step 266 that the decompression context of the decompressor 212 needs complete or partial re-initialization, the decompressor may explicitly request update or initialization of the decompression context if needed (i.e. if the relevant information is not already received).

The cause reporting messages 256 and 264 are messages built in accordance with known telecommunications standards. For instance, reserved bits of existing messages could be used to transport information related to the cause reporting mechanism. In such a case, the cause could be encoded on a few bits to be further interpreted with a correspondence table.

Figure 3:
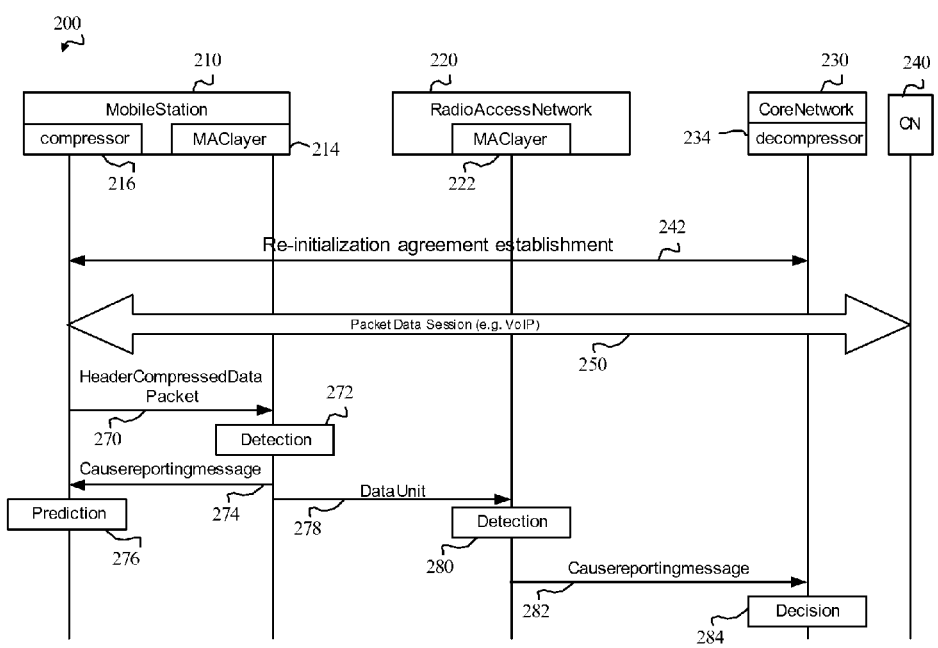
FIG. 3 is a second embodiment of a signal flow and nodal operation chart of a wireless/cellular system (e.g., CDMA2000®) implementing a cause reporting mechanism for missed or dropped packets.

It should be understood that the cause reporting mechanism described hereinbefore takes place during the course of the session 250. Therefore, it may be possible that in some occasions other data packets are sent in parallel to the prediction 258, the cause reporting message 256, the detection 266 and the cause reporting message 264 without affecting the mechanism. Furthermore, since traffic associated with the session 250 also flows toward the Correspondent Node 240, roles associated with the MS 210 and the Core Network 230 could be interchanged without departing from the spirit of the present invention. Reference is now concurrently made to FIG. 2 and FIG. 3, which shows a signal flow and nodal operation chart of the network 200 implementing the cause reporting mechanism for missed or dropped packets in such a case. More specifically, the decompressor 212 is replaced by a compressor 216 similar to the compressor 232 and the compressor 232 is replaced with a decompressor 234 similar to the decompressor 212. Similarly, the messages and the steps 252-266 are represented by messages and steps 270-284.

It should also be noted that the present invention does not describe or provide any process or procedure as to how the decompression context should be reinitialized completely, partially or updated between the decompressor 212 and the compressor 232. This is left to the IP header compression algorithm and other methods and. Furthermore, FIG. 2 only shows an exemplary network topology for the IP network 200. Various network configurations can enable the session 250 between the MS 210 and the Correspondent node 240. For instance, the MS 210 could be connected to a base station (BS) (not shown) in the Radio Access Network 230 via a cellular link (not shown), the BS being further connected to the Core Network 230 on a ground connection. Likewise, multiple nodes can be placed between the Core Network 230 and the Correspondent node 240 as long as IP traffic can be routed therebetween. Moreover, steps and functions associated with the Core Network Node 230 could be performed by multiple logical or physical nodes (e.g. Access Gateway and Proxy Service Node functions).

In some implementations of the cause reporting mechanism, the IP network 200 follows CDMA2000® standard. The CDMA2000® standard is also known as IMT-CDMA Multi-Carrier or IS-95. It is a Code-Division Multiple Access (CDMA) version of the IMT-2000 standard developed by the International Telecommunication Union (ITU). In such a case, the Core Network 230 can be assimilated to a Packet Data Service Node (PDSN). It is likely that, in such an implementation, the RAN 230 placed therebetween be composed of a BS and a Packet Control Function (PCF).

Figure 4:
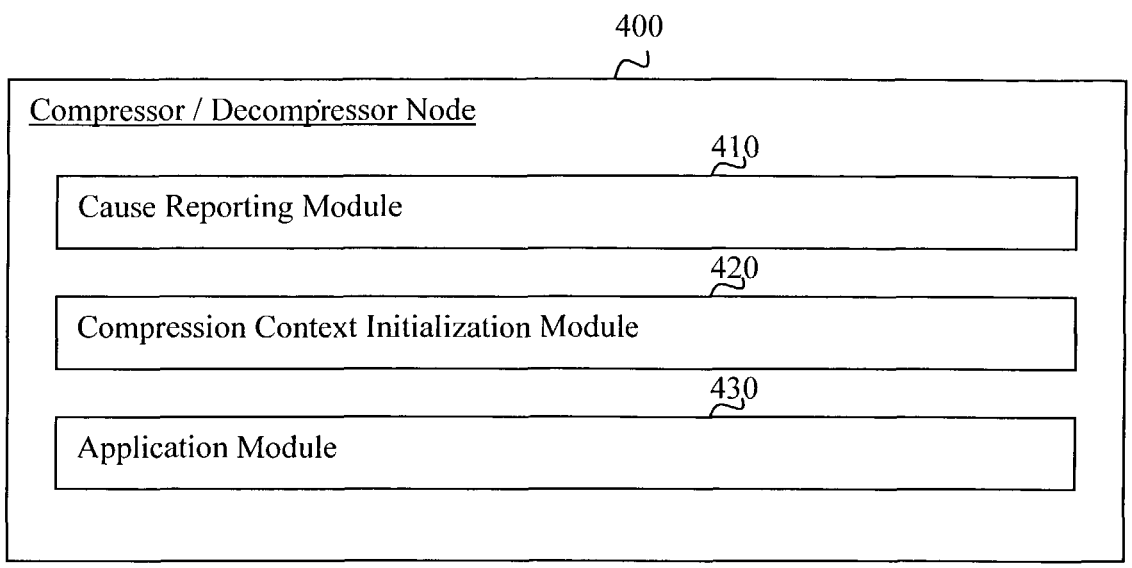
FIG. 4 is an exemplary modular representation of a compressor/decompressor node equipped to handle the cause reporting mechanism.

FIG. 4 is an exemplary modular representation of a compressor/decompressor node 400 equipped to handle the cause reporting mechanism. The compressor/decompressor node 400 has a Cause Reporting Module 410, a Compression Context Initialization Module 420, and an Application Module 430. The Cause Reporting Module 410 of the compressor/decompressor node 400 is capable of managing the cause reporting messages discussed earlier. More precisely, the Cause Reporting Module 410 is capable of receiving a cause of unsuccessful reception or sending of a compressed packet addressed to another compressor/decompressor node. The Compression Context Initialization Module 420 is capable of managing a compression context with regards to predictions and decisions described earlier. More specifically, the Compression Context Initialization Module is capable of deciding or predicting if a decompression context associated with the decompressor is invalidated by analyzing the cause of the unsuccessful reception or sending. In a further embodiment, when the compressor/decompressor node 400 acts as a decompressor, the Compression Context Initialization Module is capable of requesting information to reinitialize the decompression context from the compressor if the decompression context associated with the decompressor is invalidated. Likewise, when the compressor/decompressor node 400 acts as a compressor, the Compression Context Initialization Module is capable of sending information to reinitialize the decompression context toward the decompressor if the decompression context associated with the decompressor is to be invalidated. The Application Module 430 is capable of managing traffic associated with the session previously described.

What is claimed is:

1. A decompressor in an Internet Protocol (IP) network, the decompressor comprising:
    a Cause Reporting Module for receiving a cause reporting message including an indication of a cause of an unsuccessful reception of a compressed packet addressed to the decompressor; and
    a Compression Context Initialization Module for analyzing the received cause of the unsuccessful reception, and for initiating a re-initialization of a decompression context associated with the decompressor in accordance with the analysis, wherein the Compression Context Initialization Module determines that the decompression context should not be reinitialized responsive to determining that the cause of unsuccessful reception is related to system signaling.

2. The decompressor of claim 1, wherein the Compression Context Initialization Module requests re-initialization information from a compressor in response to initiating the re-initialization of the decompression context.

3. The decompressor of claim 1, wherein the Compression Context Initialization Module determines that the decompression context associated with the decompressor should be reinitialized by analyzing the cause of unsuccessful reception with respect to a re-initialization agreement between a compressor and the decompressor.

4. The decompressor of claim 1, wherein the Compression Context Initialization Module analyzing the received cause includes analyzing a plurality of causes of unsuccessful receptions.

5. The decompressor of claim 1, wherein the Cause Reporting Module receives the cause reporting message from a Media Access Control (MAC) layer co-located with the decompressor.

6. The decompressor of claim 1, wherein the cause of unsuccessful reception is related to pre-emption.

7. The decompressor of claim 1, wherein the received indication includes information related to a cause reporting mechanism.

8. A method for reporting cause of missing packets in an Internet Protocol (IP) network, the IP network comprising a compressor and a decompressor, the method comprising the steps of:
    detecting, at the decompressor, an unsuccessful reception of a compressed packet sent from the compressor;
    receiving a cause reporting message including an indication of a cause of the unsuccessful reception;
    analyzing the cause of the unsuccessful reception; and
    initiating a re-initialization of a decompression context in response to determining that the cause of the unsuccessful reception is not related to system signaling.

9. The method of claim 8 further comprising the step of:
    requesting re-initialization information from the compressor in response to initiating the re-initialization of the decompression context.

10. The method of claim 8, wherein the step of analyzing the cause of the unsuccessful reception includes analyzing the cause of the unsuccessful reception with respect to a re-initialization agreement between the compressor and the decompressor.

11. The method of claim 8, wherein the step of detecting the unsuccessful reception of the compressed packet is performed at a Media Access Control (MAC) layer co-located with the decompressor.

12. The method of claim 8, wherein the received indication includes information related to a cause reporting mechanism.

* * * * *